March 7, 1933.  S. I. OESTERREICHER  1,899,981
PROTECTIVE INCLOSURE FOR REACTORS AND SIMILAR APPARATUS
Filed Dec. 9, 1930  2 Sheets-Sheet 1
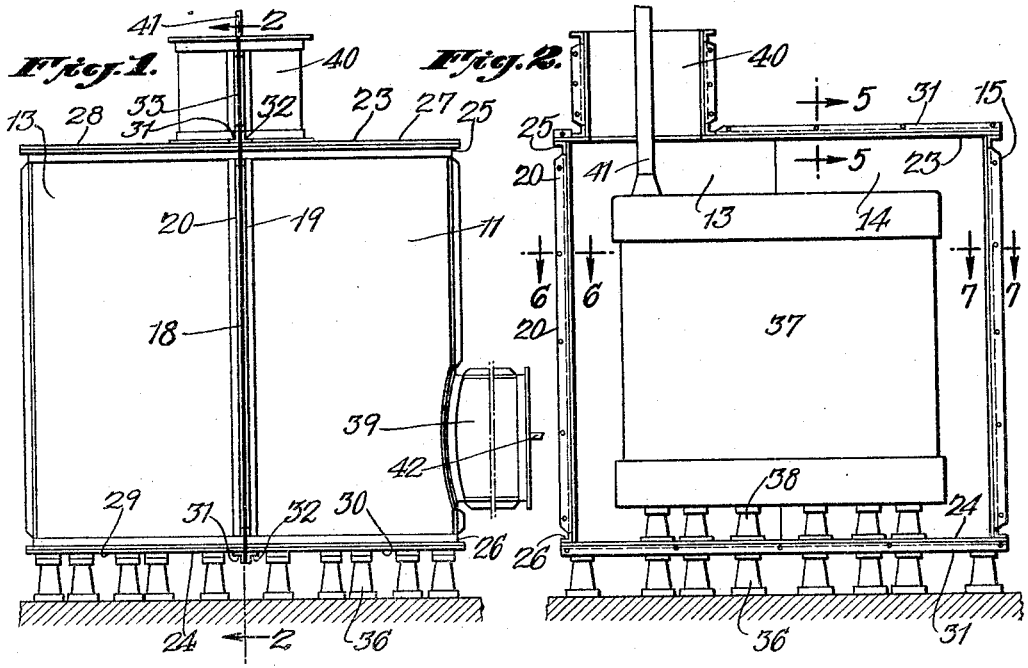
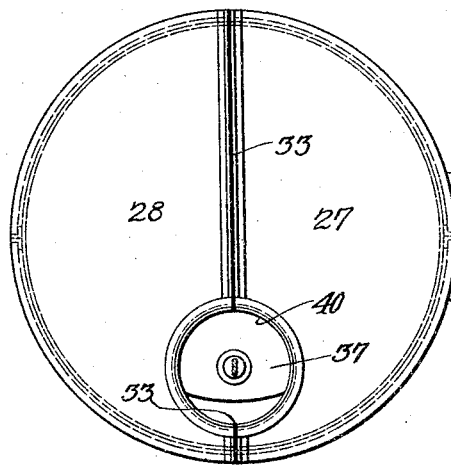
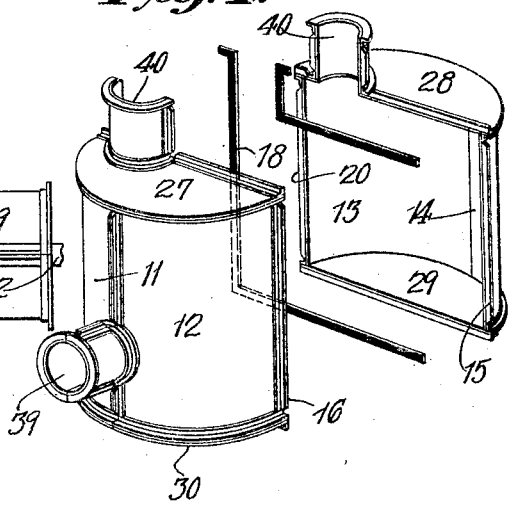
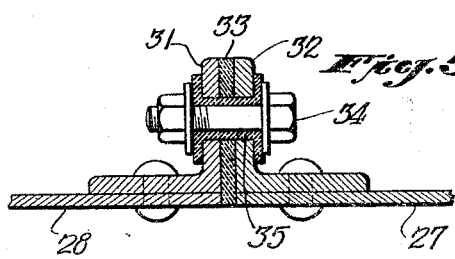
INVENTOR
SANDOR I. OESTERREICHER
BY
Usina & Rauber
ATTORNEYS March 7, 1933.   S. I. OESTERREICHER   1,899,981
PROTECTIVE INCLOSURE FOR REACTORS AND SIMILAR APPARATUS
Filed Dec. 9, 1930    2 Sheets-Sheet 2
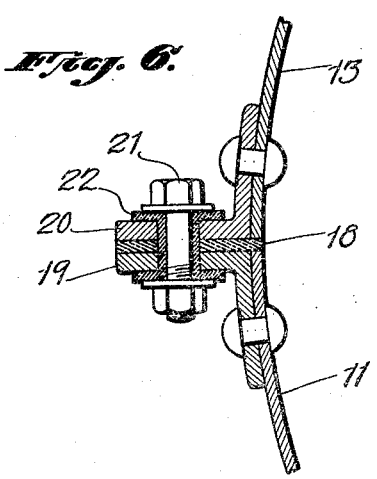
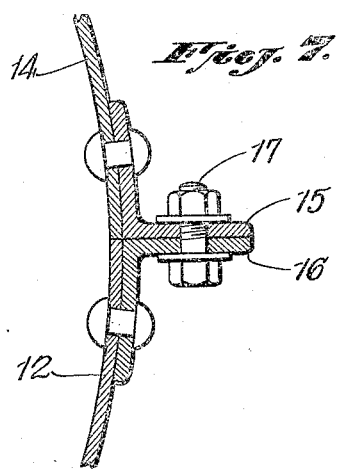
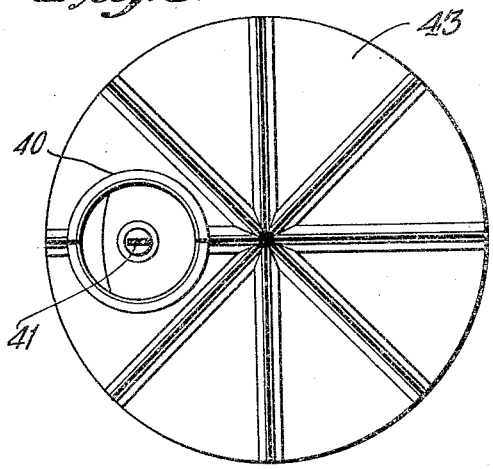
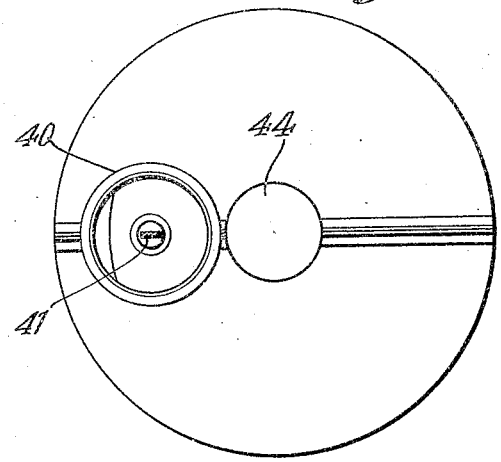
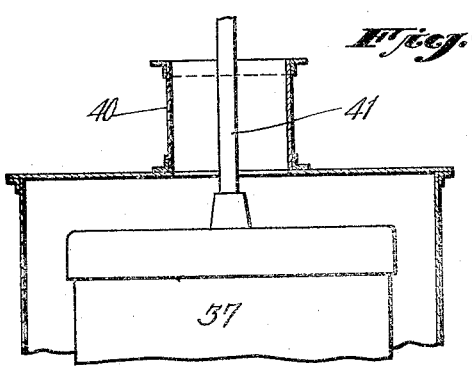
INVENTOR
SANDOR I. OESTERREICHER.
BY
ATTORNEYS Patented Mar. 7, 1933

1,899,981

UNITED STATES PATENT OFFICE

SANDOR I. OESTERREICHER, OF BROOKLYN, NEW YORK, ASSIGNOR TO METROPOLITAN DEVICE CORPORATION, OF BROOKLYN, NEW YORK, A CORPORATION OF NEW YORK

PROTECTIVE INCLOSURE FOR REACTORS AND SIMILAR APPARATUS

Application filed December 9, 1930. Serial No. 501,047.

My present invention relates to protective inclosures or shields for coils, generally, used in alternating current circuits and more particularly to reactor coils of large size used for the protection of alternating current generators and power circuits in which changing or alternating electric and magnetic forces of great intensity are involved.

Such reactor coils are used in alternating current power systems to protect the apparatus against destructive currents in the event of short circuiting.

In the installation of reactors of the above type the reactors are placed inside of metallic containers which act as shields against external or internal electrical disturbances between the reactor and ground.

Due to the large stray fluxes surrounding such reactors, secondary currents are induced in the surrounding shields or inclosures, which secondary currents during normal operation increase considerably the total reactor losses and cause considerable heating within the shields. During abnormal circuit disturbances, such as take place in short circuits, enormous mechanical forces are also created within these shields which tend to burst them. To prevent their collapse under these circumstances the shields must be made unduly heavy and strong.

An object of the present invention is to eliminate or prevent induced secondary currents in the reactor inclosure or shield.

In my invention the inclosure or shield is so constructed as to break up or isolate any secondary currents that may be formed by stray fluxes, and to break up or interrupt by insulation or other means, the paths of any secondary currents that might be generated by stray fluxes. This is preferably accomplished by making the shield or inclosure in sections and placing insulation between these sections in such a manner as to intercept and break the path of any secondary currents that may be generated in the shield. The quantities of such secondary currents may also be diminished at selected places in the shield by the use of inserts of high resistance material, or by cutting away the shield or locating openings therein at the place of greatest secondary current. The inclosure or shield may be of any desired shape such as cylindrical, square or rectangular.

The various features of the invention are illustrated in the drawings, in which;

Fig. 1 is an elevation of a reactor inclosure embodying a preferred form of the invention.

Fig. 2 is a section through the inclosure taken on the line 2—2 of Fig. 1 and showing the position of the reactor coil therein.

Fig. 3 is a plan view of the inclosure.

Fig. 4 is a perspective view showing sections of the inclosure displaced to show the manner of inserting insulating material.

Figs. 5, 6 and 7 are detail sectional views taken on lines 5—5, 6—6 and 7—7, respectively, of Fig. 2.

Fig. 8 is a plan view of a modified form of top construction for the inclosure.

Fig. 9 is a part sectional elevation of an upper part of a modified form of inclosure.

Fig. 10 is a plan view of a still further modification of the top of inclosure.

Referring more particularly to Figs. 1 to 7 of the above drawings, the inclosure is formed by a cylindrical wall formed of multiple part-cylindrical metal plates, 11, 12, 13 and 14, having suitable flanges whereby they may be joined on their longitudinal edges. The plates or sections, 11 and 12, and the plates or sections, 13 and 14, are joined to form complementary semi-cylindrical plates as indicated in Fig. 4. The vertical flange, 15, of the section 14, and a complementary flange, 16, of the section 12, are then bolted together by means of suitable bolts 17 as indicated in Fig. 7.

A strip 18 of suitable insulating material, such as micarta, fibre or rubber, is then placed between the complementary flanges 19 and 20 of the sections 11 and 13 respectively, and these flanges are bolted to opposite sides of the insulating insert 18 by means of bolts 21 or other suitable fastenings. To prevent an electrical connection between the flanges 19 and 20 through the bolt 21, the bolt 21 is encircled by and separated from the flanges 19 and 20 by a spool-like insert 22 of insulating material. In this way the sections or flanges 11 and 13 are isolated from each other and the passage of an induced or secondary electric circuit circumferentially about the wall, or shield formed of the sections 11—14 is intercepted and prevented.

It will be apparent that the flange 15, 16, 19 and 20 may be formed on their respective sections by means of angles riveted thereto or may be formed integrally or in any other suitable manner.

A top plate, 23, and a bottom plate, 24, are also provided for the inclosure and are bolted or otherwise secured at their peripheries to upper and lower flanges 25 and 26 respectively, of the cylindrical side wall. The top plate 23 is formed of two semi-cylindrical sections, 27 and 28, which fit the ends of the semi-cylindrical shields made by the sections 11—12 and 13—14 respectively.

Similarly the bottom of the inclosure is made of a pair of complementary semi-circular plates 29 and 30. The diametric edges of the plates 27, 28, 29 and 30 have outward flanges 31 and 32 similar to the flanges 19 and 20.

Strips of insulating material 33 are inserted between the flanges 31 and 32 and the flanges are bolted to opposite sides of these strips by bolts 34, as shown in Fig. 5, suitable insulating spools 35 being inserted about the shanks of the bolts. In this manner the top and bottom of the inclosure are divided into two semi-circular insulated parts. As the induced currents in the top and bottom plates have a circular path about the axis of the inclosure this insulation serves to break up and isolate these induced currents.

The reactor inclosure may be supported by means of suitable insulators, 36, and the reactor coil 37 may be similarly supported within the inclosure by suitable insulating supports 38. An inlet opening or collar, 39, is provided in the cylindrical side wall of the inclosure. The outlet opening or collar 40 is provided in the top plate of the inclosure, through which one of the conductors, 41, of the reactor pass, the other conductor, 42, entering through the collar 39. The collar 40 may be formed of two semi-cylindrical parts joined on longitudinal edges in alignment with the flanges 31 and 32 of the top plate and insulated from each other, as indicated in Fig. 4.

It will be understood that instead of dividing the top and the bottom plates into semi-circular halves, they may be divided into a number of angular segments 43 as indicated in Fig. 8, each of these segments being insulated from the adjoining one by a suitable insulating layer.

The greatest intensity of magnetic flux occurs in the centre of the top and bottom plates. To avoid the generation of excessive currents at these places, the outlet passage 40 for the conductor 41 may be located at the centre of the top plate, as shown in Fig. 9, by thus eliminating metal for the passage of currents, induced currents at these places may be entirely eliminated. Or an opening may be provided at the centre of the top or bottom plates and may be closed by a plate 44 of very highly resistant material which, through its high resistance minimizes any induced currents that may be generated at this point.

It will be understood that the above embodiments may be modified to accommodate them to different shapes and conditions of use. Through the above invention secondary currents induced in the reactor inclosure are intercepted and broken up or reduced, thereby eliminating the heating and energy losses and eliminating the expensive and destructive forces occurring upon short circuiting.

What I claim is:

1. Electric apparatus comprising a reactance coil and an inclosure therefor, comprising a metallic shield and intercepting strips of insulating material in the path of secondary induced currents in said inclosure.

2. Electric apparatus comprising a reactance coil and an inclosure therefor, comprising sections having adjoining edges intersecting the path of induced currents and separated and insulated from each other.

3. Electric apparatus comprising a reactance coil and an inclosure therefor which comprises a cylindrical wall, said wall being discontinuous circumferentially and the opposite edges at said discontinuity being insulated from each other.

4. Electric apparatus comprising a reactance coil and an inclosure therefor which comprises an encircling wall, said wall being discontinuous circumferentially and the opposed edges at said discontinuity being insulated from each other.

5. Electric apparatus comprising a reactance coil and an inclosure therefor, comprising an encircling wall and longitudinally insulating inserts in said wall to interrupt the circuit about the said wall.

6. Electric apparatus comprising a reactance coil and an inclosure therefor, which comprises an encircling wall, said wall being made of sections joined at longitudinal joints, and longitudinally insulating strips between said sections.

7. Electric apparatus comprising a reactance coil and an inclosure therefor, which comprises an encircling wall, said wall being made of sections joined at longitudinal joints, and longitudinally insulating strips between said sections, and end plates completing said inclosure, said end plates having current impeding means.

8. Electric apparatus comprising a reactance coil and an inclosure therefor, which comprises an encircling wall, said wall being made of sections joined at longitudinal joints, and longitudinal insulating strips between said sections, and end plates, said end plates having radial current intercepting means.

9. An inclosure for reactors and similar apparatus, which comprises an encircling wall, said wall being made of sections joined at longitudinal joints, and longitudinally insulating strips between said sections, end plates and radial intercepting strips in said end plates.

10. An inclosure for reactors and similar apparatus, which comprises an encircling wall, said wall being made of sections joined at longitudinal joints, and longitudinally insulating strips between said sections, and end plates completing said inclosure and containing a central opening therein.

11. An inclosure for reactors and similar apparatus, which comprises an encircling wall, said wall being made of sections joined at longitudinal joints, and longitudinally insulating strips between said sections, and end plates completing said inclosure and containing a central opening therein, end plates and high resistance plates covering said central opening.

In witness whereof, I have hereunto signed my name.

SANDOR I. OESTERREICHER.